US010066047B2

(12) United States Patent
George et al.

(10) Patent No.: US 10,066,047 B2
(45) Date of Patent: Sep. 4, 2018

(54) POLYURETHANE FOAMS WITH DECREASED ALDEHYDE EMISSIONS, A PROCESS FOR PREPARING THESE FOAMS AND A METHOD FOR DECREASING ALDEHYDE IN POLYURETHANE FOAMS

(75) Inventors: Emmanuel George, Charleston, WV (US); Mark A. Koshute, Beaver, PA (US); Brian L. Neal, Scott Depot, WV (US); Carl Thompson, Moon Township, PA (US); Adona Marcum, St. Albans, WV (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 13/364,385

(22) Filed: Feb. 2, 2012

(65) Prior Publication Data
US 2013/0203880 A1 Aug. 8, 2013

(51) Int. Cl.
| | |
|---|---|
| *C08G 18/16* | (2006.01) |
| *C08G 18/48* | (2006.01) |
| *C08G 18/50* | (2006.01) |
| *C08G 18/72* | (2006.01) |
| *C08G 18/76* | (2006.01) |
| *C08G 18/79* | (2006.01) |
| *C08G 18/40* | (2006.01) |
| *C08G 18/08* | (2006.01) |
| *C08G 101/00* | (2006.01) |

(52) U.S. Cl.
CPC ..... *C08G 18/4837* (2013.01); *C08G 18/0876* (2013.01); *C08G 18/409* (2013.01); *C08G 18/4072* (2013.01); *C08G 18/5039* (2013.01); *C08G 18/724* (2013.01); *C08G 18/7621* (2013.01); *C08G 18/792* (2013.01); *C08G 2101/0008* (2013.01); *C08G 2101/0083* (2013.01); *C08G 2290/00* (2013.01)

(58) Field of Classification Search
None
See application file for complete search history.

(56) References Cited

U.S. PATENT DOCUMENTS

| | | | | |
|---|---|---|---|---|
| 3,325,421 A * | 6/1967 | Muller | ............... | C08G 18/0876 516/20 |
| 4,042,537 A * | 8/1977 | Dahm et al. | ................... | 521/128 |
| 4,089,835 A * | 5/1978 | Konig | ............... | C08G 18/0876 516/102 |
| 4,092,275 A * | 5/1978 | Reischl | ................. | C08G 18/08 521/137 |
| 4,093,569 A * | 6/1978 | Reischl | ................. | C08G 18/08 521/137 |
| 4,119,613 A * | 10/1978 | Reischl | ................. | B01J 19/243 526/64 |
| 4,147,680 A * | 4/1979 | Reischl | ................. | C08G 18/08 521/163 |
| 4,184,990 A * | 1/1980 | Reischl | ................. | C08G 18/08 521/155 |
| 4,293,470 A * | 10/1981 | Cuscurida | ............ | C08G 18/089 528/49 |
| 4,296,213 A * | 10/1981 | Cuscurida | ............... | C08G 18/12 521/137 |
| 4,305,857 A * | 12/1981 | Reischl | ................. | C08G 18/08 524/724 |
| 4,305,858 A * | 12/1981 | Reischl | ................. | C08G 18/08 264/DIG. 5 |
| 4,310,448 A * | 1/1982 | Reischl | ................. | C08G 18/08 521/163 |
| 4,310,449 A * | 1/1982 | Reischl | ................. | C08G 18/08 521/163 |
| 4,324,716 A * | 4/1982 | Reischl | ............. | C08G 18/0804 521/117 |
| 4,374,209 A * | 2/1983 | Rowlands | .............. | C08G 18/08 521/116 |
| 4,496,678 A * | 1/1985 | Wenzel | ............. | C08G 18/0876 524/157 |
| 4,523,025 A * | 6/1985 | Cuscurida | .......... | C08G 18/0857 252/182.26 |
| 4,569,952 A * | 2/1986 | Radovich | ........... | C08G 18/5033 252/182.25 |
| 4,668,734 A * | 5/1987 | Dietrich | ............. | C08G 18/0876 524/714 |
| 4,748,192 A * | 5/1988 | Smith | ................... | C08G 18/163 521/107 |
| 4,761,434 A * | 8/1988 | Dietrich | ............. | C08G 18/0876 521/128 |
| 4,847,320 A * | 7/1989 | Lowery | ............. | C08G 18/0876 524/424 |
| 5,332,763 A * | 7/1994 | Koshute | ............. | C08G 18/0876 521/129 |
| 5,342,855 A | 8/1994 | Lucarelli et al. | | |
| 5,373,028 A | 12/1994 | McAfee et al. | | |
| 5,415,802 A * | 5/1995 | Milliren | ............. | C08G 18/4009 252/182.25 |
| 5,880,167 A * | 3/1999 | Krebs | ................. | C08G 18/2805 521/155 |
| 5,889,068 A | 3/1999 | Madaj et al. | | |
| 6,352,658 B1 | 3/2002 | Chang et al. | | |
| 6,559,196 B2 | 5/2003 | Narayan et al. | | |
| 7,678,840 B2 | 3/2010 | Jenny et al. | | |
| 8,232,364 B2 | 7/2012 | Hoffman et al. | | |
| 2006/0073321 A1 | 4/2006 | Kaushiva et al. | | |
| 2006/0141236 A1 | 6/2006 | Nakamura et al. | | |
| 2007/0287762 A1 | 12/2007 | Casati et al. | | |
| 2008/0125507 A1* | 5/2008 | Jenny et al. | ................... | 521/137 |

(Continued)

FOREIGN PATENT DOCUMENTS

| | | |
|---|---|---|
| GB | 1453258 | 10/1976 |
| WO | WO 2005/007721 | * 1/2005 |

*Primary Examiner* — Jeffrey D Washville
(74) *Attorney, Agent, or Firm* — N. Denise Brown

(57) ABSTRACT

This invention relates to polyurethane foams which exhibit decreased aldehyde emission, to a process of preparing these polyurethane foams, and to a method of decreasing aldehyde emissions in foams. The polyurethane foams herein additionally comprise a small quantity of a polyhydrazodicarbonamide dispersion polyol to the isocyanate-reactive component, or a trimerized hexamethylene diisocyanate to the polyisocyanate component.

15 Claims, No Drawings

(56) References Cited

U.S. PATENT DOCUMENTS

| | | |
|---|---|---|
| 2008/0128101 A1 | 6/2008 | Furman et al. |
| 2011/0060063 A1 | 3/2011 | Yabuno et al. |
| 2012/0184639 A1 | 7/2012 | Haas et al. |

\* cited by examiner

POLYURETHANE FOAMS WITH DECREASED ALDEHYDE EMISSIONS, A PROCESS FOR PREPARING THESE FOAMS AND A METHOD FOR DECREASING ALDEHYDE IN POLYURETHANE FOAMS

BACKGROUND OF THE INVENTION

This invention relates to polyurethane foams which exhibit decreased aldehyde emissions, a process of making these foams with decreased aldehyde emissions and a method of decreasing aldehyde emissions in polyurethane foams.

Aldehyde exposure limits, including limits specifically for formaldehyde and acetaldehyde, have been assigned by NIOSH and OSHA. These exposure limits are of significant interest to the Automobile and slabstock industries in the overall efforts of these industries to enhance the air quality of the auto-cabin and of bedding materials. End users of automobiles and bedding materials are exposed to any excess VOCs (volatile organic compounds), including aldehydes, that may be emitted from the foams.

From previous studies it is known that both foams and the polyether polyols used to produce foams emit aldehydes when heated in the presence of air. Thus, most polyurethane foams and processes for producing these foams will result in the emission of aldehydes.

Japan Automobile Manufacturers Association (JAMA) has identified several VOCs, including formaldehyde and acetaldehyde, as contributors to the so-called "sick-house syndrome". Increasingly, it is common for automotive foams to be required to pass the Toyota test, i.e. the TSM0508G test, and for slabstock foams to pass the CertiPUR/LGA/-EUROPUR/IKEA tests. Foam products in Europe which satisfy one or more of these tests may be given a seal or stamp to indicate this. Thus, it is not uncommon in Europe for customers to look for foam products which bear these seals or stamps.

Various approaches for reducing aldehyde emissions have been tried. U.S. Published Patent Application 20080281013 discloses that aldehyde emissions in heated storage of a polyurethane resin can be reduced by including at least one sulfurous compound in the polyol component which is used to prepare the polyurethane resin. Suitable sulfurous compounds are selected from the group consisting of hydrogen sulfites and disulfites. Typically, from 0.02 to 2 parts by weight of sulfurous compounds are added for every 100 parts of the polyol component.

Any manufacturer that can make and/or sell polyurethane foams that can pass these stringent requirements, particularly with respect to aldehyde emissions, has a significant competitive advantage over their competitors. New ways of reducing aldehyde emissions and lowering the exposure of end-users and customers to these emissions are highly desirable in the industry.

A reactive system and a process for reducing free MDI emissions in cavity filling NVH polyurethane foams is disclosed in U.S. Pat. No. 7,678,840. These systems comprise a polymethylene poly(phenyl-isocyanate) which has a polymeric MDI content of greater than 70% by weight and a monomeric MDI content of less than 30% by weight, and the monomeric MDI is comprised of less than or equal to 25% by weight of the 4,4'-isomer, less than or equal to 5% by weight of the 2,4'-isomer and less than or equal to 2% of the 2,2'-isomer. These reactive systems are suitable for acoustic foams and structural foams which have reduced isocyanate emissions, i.e. decreased quantities of free MDI.

U.S. Published Patent Application 20080125507 discloses reactive systems and a process for reducing VOC (volatile organic compound) emissions from low density cavity filling NVH polyurethane foams. These reactive systems comprise (A) a polymethylene poly(phenylisocyanate) having a polymeric content of greater than or equal to 55% by weight, and a monomeric content of less than or equal to 45% by weight; and (B) an isocyanate-reactive component comprising (1) at least one isocyanate-reactive compound having a molecular weight of from about 1,000 to about 10,000, a functionality of from about 2 to about 6 and an OH number of from about 10 to about 340; and (2) at least one isocyanate-reactive compound having a molecular weight of from about 60 to less than 1,000, a functionality of about 2 to about 4, and an OH number of from about 110 to about 3750; wherein at least one of (B)(1) and (B)(2) comprises an amine-initiated compound; in the presence of (C) at least one catalyst; and (D) a blowing agent comprising water.

Foams having reduced visible emissions during curing are disclosed in U.S. Pat. No. 5,373,028. These foams are prepared from a formulation comprising (a) a polyisocyanate, (b) an isocyanate-reactive component, (c) a visible emissions producing component, and (d) a visible emissions reducing agent, with these components being reacted under conditions to form a polyurethane and/or polyurea foam and the foam is cooled, wherein visible emissions are emitted during the cooling. The presence of (d) the visible emissions reducing agent in the foam formulation results in lower amounts of visible emissions being emitted from the foam during curing. Antioxidants are described as visible emissions producing components. Suitable visible emissions reducing agents disclosed are (a) alkali metal dihydrogen phosphates and polyphosphates, (b) alkali metal sulfates, (c) aluminum sulfates, phosphates, polyphosphates, borates and alkanoates, (d) ammonium sulfates, phosphates, polyphosphates, borates and alkanoates, (e) acid chlorides, and (f) mixtures thereof.

Filled polyols are known and described in the art. These filled polyols are typically polyether polyols that are "filled" with other organic polymers to produce viscous, white to off-white, fluids that are suitable for preparing foams with increased (i.e. higher) hardness levels that conventional, unmodified polyols can produce. In general, filled polyols are prepared by in situ polymerization of one or more monomers in a polyol base, using either free-radical or step addition processes. Common types of filled polyols include styrene-acrylonitrile polymer polyols (i.e. SAN polymer polyols), polyhydrazondicarbonamide (i.e. PHD) polyols, and polyisocyanate polyaddition polyols (i.e. PIPA polyols).

PHD polyols or polyhydrazodicarbonamide polyols that comprise the reaction products of (a) one or more polyisocyanates, with (b) one or more hydrazines, polyamines, dihydrazides, ammonia, urea, and/or low molecular weight polyols, and (c) optionally higher molecular weight polyols, and (d) optionally, formaldedhyde, in the presence of one or more polyhydric alcohols having a molecular weight of between 62 and 450, and described in U.S. Pat. No. 4,324,716. These dispersions have solids contents of from about 5 to 70% by weight, and are clear, storage stable solutions with a relatively low viscosity. In the examples of this reference, the foams are prepared from conventional polyether polyols and PHD polyols. Reducing the emissions of aldehydes in foam products is not disclosed or mentioned in U.S. Pat. No. 4,324,716.

Although various approaches have been taken to reduce different types of emissions from polyurethane foams and/or polyurea foams, none of the prior approaches includes the addition of small amounts of trimerized hexamethylene diisocyanate to the polyisocyanate component, or small amounts of a polyhydrazodicarbonamide dispersion to the isocyanate-reactive component. It is an object of the present invention to reduce aldehyde emissions in foam products Advantages of the present invention include the ability to form foam products with reduced aldehyde emissions by the addition of low levels of trimerized hexamethylene diisocyanate to the polyisocyanate component, or small amounts of a polyhydrazodicarbonamide dispersion polyol to the isocyanate-reactive component, and the ability to product foam products that comply with different regulation emissions as described above.

SUMMARY OF THE INVENTION

This invention relates to a polyurethane foam comprising the reaction product of:
(1) a polyisocyanate component (preferably comprising toluene diisocyanate),
with
(2) an isocyanate-reactive component comprising:
  (a) at least one polyether polyol having a functionality of from 2 to 6, an OH number of from 18 to 238, and a number average molecular weight of from 160 to 8000, and
  (b) at least one filled polyol having an OH number of 18 to 32, a number average molecular weight of 2000 to 8000, and containing from 5 to 60% by weight of solids, which is selected from the group consisting of (i) styrene/acrylonitrile polymer polyols, (ii) polyisocyanate polyaddition (PIPA) polyols which are dispersions of polyurethanes formed by the in situ reaction of an isocyanate and an alkanolamine, and (iii) mixtures thereof;
  in the presence of
(3) at least one blowing agent,
(4) at least one catalyst,
and
(5) at least one surfactant.

In accordance with the present invention, these polyurethane foams additionally comprise: from 0.5 to 8 parts of trimerized hexamethylene diisocyanate per 100 parts of (1) the polyisocyanate component, or from 2 to 5.5 parts of at least one polyhydrazodicarbonamide dispersion polyol per 100 parts of (2) the isocyanate-reactive component.

The present invention is also directed to a process for preparing these polyurethane foams. This process comprises:
(A) reacting:
  (1) a polyisocyanate component (preferably comprising toluene diisocyanate),
  with
  (2) an isocyanate-reactive component comprising:
    (a) at least one polyether polyol having a functionality of from 2 to 6, an OH number of from 18 to 238, and a number average molecular weight of from 160 to 8000,
    and
    (b) at least one filled polyol having an OH number of 18 to 32, a number average molecular weight of 2000 to 8000, and containing from 5 to 60% by weight of solids, which is selected from the group consisting of (i) styrene/acrylonitrile polymer polyols, (ii) polyisocyanate polyaddition (PIPA) polyols which are dispersions of polyurethanes formed by the in situ reaction of an isocyanate and an alkanolamine and (iii) mixtures thereof;
  in the presence of
  (3) one or more blowing agents;
  (4) at least one catalyst;
  and
  (5) at least one surfactant;
  wherein (1) said polyisocyanate component additionally comprises: from 0.5 to 8 parts of trimerized hexamethylene diisocyanate per 100 parts of the polyisocyanate component, or (2) said isocyanate-reactive component additionally comprises: from 2 to 5.5 parts of at least one polyhydrazodicarbonamide dispersion polyol per 100 parts of (2) the isocyanate-reactive component.

This invention also relates to a method of decreasing formaldehyde emissions in a polyurethane foam. This method comprises:
(A) reacting:
  (1) a polyisocyanate component (preferably comprising toluene diisocyanate),
  with
  (2) an isocyanate-reactive component comprising:
    (a) at least one polyether polyol having a functionality of from 2 to 6, an OH number of from 18 to 238, and a number average molecular weight of from 160 to 8000,
    and
    (b) at least one filled polyol having an OH number of 18 to 32, a number average molecular weight of 2000 to 8000, and containing from 5 to 60% by weight of solids, which is selected from the group consisting of (i) styrene/acrylonitrile polymer polyols, (ii) polyisocyanate polyaddition (PIPA) polyols which are dispersions of polyurethanes formed by the in situ reaction of an isocyanate and an alkanolamine, and (iii) mixtures thereof;
  in the presence of
  (3) one or more blowing agents;
  (4) at least one catalyst,
  and
  (5) at least one surfactant;
  wherein (1) said polyisocyanate component additionally comprises: from 0.5 to 8 parts of trimerized hexamethylene diisocyanate per 100 parts of the polyisocyanate component, or (2) said isocyanate-reactive component additionally comprises: from 2 to 5.5 parts of at least one polyhydrazodicarbonamide dispersion polyol per 100 parts of the isocyanate-reactive component.

DETAILED DESCRIPTION OF THE INVENTION

Except in the operating examples, or where otherwise indicated, all numbers expressing quantities, percentages, OH numbers, functionalities and so forth in the specification are to be understood as being modified in all instances by the term "about."

All ranges as set forth herein are intended to be inclusive of the end points unless expressly stated otherwise.

As used herein, the following terms shall have the following meanings.

As used herein, the hydroxyl number is defined as the number of milligrams of potassium hydroxide required for the complete hydrolysis of the fully phthalylated derivative prepared from 1 gram of polyol. The hydroxyl number can also be defined by the equation:

OH=(56.1×1000)/Eq. Wt.

wherein:
OH: represents the hydroxyl number of the polyol,
Eq. Wt. represents the average equivalent weight of the polyol.

As used herein, the functionality of the polyol represents the average functionality of the polyol, i.e. the average number of hydroxyl groups per molecule.

As used herein, the term molecular weight refers to the number average molecular weight unless indicated otherwise.

By the term "Isocyanate Index" (also commonly referred to as "NCO index"), is defined herein as the equivalents of isocyanate, divided by the total equivalents of isocyanate-reactive hydrogen containing materials, multiplied by 100.

As used herein, unless otherwise expressly specified, all of the numerical ranges, amounts, values and percentages such as those for amounts of materials, times and temperatures of reaction, ratios of amounts, values for molecular weight, and others in the following portion of the specification may be read as if prefaced by the word "about" even though the term "about" may not expressly appear with the value, amount or range.

In accordance with the present invention, suitable polyisocyanate components comprise the polyisocyanates which are readily accessible industrially such as, e.g., 2,4- and 2,6-toluenediisocyanate and any desired mixtures of these isomers ("TDI"); polyphenyl-polymethylene-polyisocyanates, such as are prepared by aniline-formaldehyde condensation and subsequent phosgenation ("crude MDI") and polyisocyanates containing carbodiimide groups, urethane groups, allophanate groups, isocyanurate groups, urea groups or biuret groups ("modified polyisocyanates"), in particular those modified polyisocyanates which are derived from 2,4- and/or 2,6-toluene-diisocyanate or from 4,4'-and/or 2,4'-diphenylmethane-diisocyanate. Preferably, the polyisocyanate component comprises an aromatic di- or polyisocyanate. More preferably, the polyisocyanate component comprises at least one compound chosen from the group consisting of 2,4- and 2,6-toluenediisocyanate, 4,4'- and 2,4'- and 2,2'-diphenylmethane-diisocyanate and polyphenyl-polymethylene-polyisocyanate ("polynuclear MDI"). Toluene diisocyanate is a particularly preferred polyisocyanate component herein.

In general, toluene diisocyanate will preferably be used as 2,4-and/or 2,6-toluene diisocyanate and mixtures of these isomers (TDI). For example, the toluene diisocyanate herein may contain from 35 to 20% by weight of the 2,6-isomer of toluene diisocyanate and from 65% to 80% by weight of the 2,4-isomer of toluene diisocyanate, with the sum of the 2,6-isomer and the 2,4-isomer totaling 100% of the toluene diisocyanate. In addition, if polyisocyanate is 100% toluene diisocyanate, the sum of the 2,6-isomer and the 2,4-isomer will total 100% of the polyisocyanate component.

It is more preferred that the toluene diisocyanate herein contain from 19 to 21% by weight of the 2,6-isomer and from 79 to 81% by weight of the 2,4-isomer, with the sum of the 2,6-isomer and the 2,4-isomer totaling 100% of the toluene diisocyanate (and 100% of the polyisocyanate if the polyisocyanate is 100% toluene diisocyanate).

Residue products of polyisocyanates and diisocyanates are not suitable to be used as component (1) in accordance with the present invention.

In addition, trimers of hexamethylene diisocyanate are excluded from polyisocyanate component (1).

The suitable isocyanate-reactive component of the present invention comprises (a) at least one polyether polyol having a functionality of from 2 to 6, an OH number of from 18 to 238, and a number average molecular weight of from 160 to 8000, and (b) at least one filled polyol having an OH number of 18 to 32, a number average molecular weight of 2000 to 8000, and containing from 5 to 60% by weight of solids, which is selected from the group consisting of (i) styrene/acrylonitrile polymer polyols, (ii) polyisocyanate polyaddition (PIPA) polymers which are dispersions of polyurethanes formed by the in situ reaction of an isocyanate and an alkanolamine, and (iii) mixtures thereof.

In accordance with the present invention, (2) the isocyanate-reactive component typically comprises (a) from 20 to 90% by weight (and preferably 40 to 90% by weight) of one or more polyether polyols, and (b) from 10 to 80% by weight (preferably 10 to 60% by weight) of one or more filled polyols, with the sum of the %'s by weight of (a) and (b) totaling 100% by weight of (2) the isocyanate-reactive component.

Suitable polyether polyols to be used as component (2)(a) herein typically have a functionality of from 2 to 6, an OH number of from 18 to 238, and a number average molecular weight of from 160 to 8000. Preferably, these polyether polyols have a functionality of from 2.5 to 3.5, and an OH number of from 28 to 42.

In general, suitable polyether polyols for the present invention are typically the reaction product of a suitable initiator or starter compound with one or more alkylene oxides in the presence of a basic catalyst such as KOH, NaOH, BF$_3$, etc. These polyether polyols satisfy the above disclosed ranges for functionality, OH number, and number average molecular weight.

Suitable starter or initiators for the polyoxyalkylene polyols which can be used are the alkylene oxide adducts of a variety of suitable initiator molecules. Non-limiting examples include dihydric initiators such as ethylene glycol, diethylene glycol, triethylene glycol, propylene glycol, dipropylene glycol, tripropylene glycol, neopentyl glycol, 1,3-propanediol, 1,4-butanediol, 1,6-hexanediol, 1,4-cyclohexanediol, 1,4-cyclohexane-dimethanol, hydroquinone, hydroquinone bis(2-hydroxyethyl)ether, the various bisphenols such as bisphenol A and bisphenol F and their bis (hydroxyalkyl)ether derivatives, aniline, the various N—N-bis(hydroxyalkyl)anilines, primary alkyl amines and the various N—N-bis(hydroxyalkyl)amines; trihydric initiators such as glycerine, trimethylolpropane, trimethylolethane, the various alkanolamines such as ethanolamine, diethanolamine, triethanolamine, propanolamine, dipropanolamine, and tripropanolamine; tetrahydric initiators such as pentaerythritol, ethylene diamine, N,N,N',N'-tetrakis[2-hydroxy-alkyl]ethylenediamines, toluene diamine and N,N,N',N'-tetrakis[hydroxy-alkyl]toluene diamines; pentahydric initiators such as the various alkylglucosides, particularly α-methylglucoside; hexahydric initiators such as sorbitol, mannitol, hydroxyethylglucoside, and hydroxypropyl glucoside; octahydric initiators such as sucrose; and higher functionality initiators such as various starch and partially hydrolyzed starch-based products, and methylol group-containing resins and novolak resins such as those prepared from the reaction of as aldehyde, preferably formaldehyde, with a phenol, cresol, or other aromatic hydroxyl-containing compound.

Such starters or initiators are typically copolymerized with one or more alkylene oxides to form the polyether polyols used herein. Examples of such alkylene oxides include ethylene oxide, propylene oxide, butylenes oxide, styrene oxide and mixtures thereof. Mixtures of these alkylene oxides can be added simultaneously or sequentially to provide internal blocks, terminal blocks or random distribution of the alkylene oxide groups in the polyether polyol.

The most common process for polymerizing such polyols is the base catalyzed addition of the oxide monomers to the active hydrogen groups of the polyhydric initiator and subsequently to the oligomeric polyol moieties. Potassium hydroxide or sodium hydroxide are the most common basic catalyst used. Polyols produced by this process can contain significant quantities of unsaturated monols resulting from the isomerization of oxypropylene monomer to allyl alcohol under the conditions of the reaction. This monofunctional alcohol can then function as an active hydrogen site for further oxide addition.

Another suitable class of polyether polyols are the polyoxyalkylene polyols which contain low unsaturation (low monol) contents. These polyoxyalkylene polyols as herein defined are prepared by oxyalkylating a suitably hydric initiator compound with propylene oxide and ethylene oxide in the presence of a double metal cyanide catalyst. Preferably, double metal cyanide complex catalysts such as those disclosed in U.S. Pat. Nos. 5,158,922 and 5,470,813, the disclosures of which are hereby incorporated by reference, are used. Particularly preferred polyols include the random poly(oxypropylene/oxy-ethylene) polyols having low unsaturation as described herein, for example, U.S. Pat. No. 5,605,939, the disclosure of which is hereby incorporated by reference. The amount of ethylene oxide in the ethylene oxide/propylene oxide mixture may be increased during the latter stages of the polymerization to increase the primary hydroxyl content of the polyol. Alternatively, the low unsaturation polyol may be capped with ethylene oxide using non-DMC catalysts.

A particularly preferred polyether polyol to be used as component (2)(a) in the present invention comprises the reaction product of glycerine with propylene oxide and ethylene oxide in a weight ratio of 80:20 (PO:EO), This polyether oxyalkylene polyol has a functionality of about 3, and an OH number of about 35.

Another particularly preferred polyether polyol to be used as component (2)(a) in the present invention comprises the reaction product of a starter mixture comprising glycerine and a higher functionality starter compound with propylene oxide and ethylene oxide in a weight ratio of about from about 80:20 to 85:15 (PO:EO). This polyether polyol has a functionality of about 3, and an OH number of about 30 to 35.

Suitable filled polyols for component (2)(b) in accordance with the present invention typically have an OH number of from 18 to 32, have a number average molecular weight of 2000 to 8000; and contain from 5 to 60%, preferably from 10 to 50% by weight of solids. These filled polyols are selected from the group consisting of (i) SAN polymer polyols, (ii) polyisocyanate polyaddition (PIPA) polyols, and (iii) mixtures thereof.

Suitable (i) SAN polymer polyols herein are prepared by free radical polymerization of monomers (i.e. styrene and acrylonitrile) in a polyol carrier (or base polyol) to produce a free radical polymer dispersed in the polyol carrier (or base polyol). More specifically, polymer polyols Conventionally, the solids content of SAN polymer polyols is from about 5% up to about 60%, and preferably in the range of from about 10% to about 50%, by weight of the total weight of the composition (i.e., free radical polymer and polyol carrier). Generally, these SAN polymer polyols have a viscosity in the range of from about 2,000 to about 8,000 centipoise.

Examples of suitable polymer polyols to be used as component (2)(b)(i) herein include those polymer polyols disclosed in, for example, but are not limited to, U.S. Pat. Nos. 5,321,077, 5,324,774, 5,364,906, 5,358,984, 5,453,469, 5,488,085, 5,496, 894, 5,554,662, 5,594,066, 5,814,699, 5,824,712, 5,916,994, 5,995,534, 5,990,185, 6,117,937, 6,455,603, 6,472,447, 6,624,209, 6,713,599, 6,756,414, 7,179,882, 7,759,423, etc., the disclosures of which are hereby incorporated by reference.

The SAN polymer polyols suitable for the present invention are prepared by the in-situ polymerization of acrylonitrile and styrene, in a base polyol. Suitable base polyols may be conventional polyether polyols, polyester polyols, poly(oxyalkylene) polyols, etc. Methods for preparing SAN polymer polyols are known and described in, for example, U.S. Pat. Nos. 3,304,273; 3,383,351; 3,523,093; 3,652,639; 3,823,201; 4,104,236; 4,111,865; 4,119,586; 4,125,505; 4,148,840; 4,172,825; 4,524,157; 4,690,956; Re-28,715; and Re-29,118, the disclosures of which are hereby incorporated by reference.

A preferred SAN polymer polyol to be used as component (2)(b)(i) in the present invention comprises the free radical polymerization product of styrene and acrylonitrile in a base polyol, wherein the base polyol has a functionality of about 3, a molecular weight of about 4750, and an OH number of about 20. The solids content of this SAN polymer polyol is about 43% solids, in which the styrene to acrylonitrile content is about 64% to 36%.

Another preferred SAN polymer polyol for component (2)(b)(i) in the present invention comprises the free radical polymerization product of styrene and acrylonitrile in a base polyol, wherein the base polyol has a functionality of about 3, a molecular weight of about 3000, and an OH number of about 28. The solids content of this SAN polymer polyol is about 44% solids, in which the styrene to acrylonitrile content is about 67% to 33%.

Suitable polyisocyanate polyaddition polyols for component (2)(b) (ii) contains polyurethane particles dispersed in a polyol carrier (i.e. base polyol). The polyurethane particles in PIPA polyols are formed in situ by reaction of an isocyanate and alkanolamine (e.g., triethanolamine). The solids content of the PIPA polyols may typically range from 5% up to about 60%, and preferably in the range of from about 10% to about 50%, by weight of the total weight of the composition (i.e., polyurethane particles and polyol carrier). Generally, PIPA polyols have a viscosity in the range of from about 4,000 to about 50,000 centipoise. Examples of suitable PIPA polyols can be found in, for example, U.S. Pat. Nos. 4,374,209 and 5,292,778, the disclosures of which are herein incorporated by reference.

Suitable (3) blowing agents to be used in accordance with the present invention include halogenated hydrocarbons, water, liquid carbon dioxide, low boiling solvents such as, for example, pentane, and other known blowing agents. Water may be used alone or in conjunction with other blowing agents such as, for example, pentane, acetone, cyclopentanone, cyclohexane, partially or completely fluorinated hydrocarbons, methylene chloride and liquid carbon dioxide. It is preferred that water is used as the sole blowing agent. Generally, speaking, the quantity of blowing agent present is from about 1 to about 7 parts, preferably from about 1 to about 5 parts by weight, based on the weight of 100 parts by weight of component (2) the isocyanate-reactive component.

Suitable (4) catalysts for the present invention include the amine and tin based catalysts, which are preferred. Other catalysts may be used as well. Examples of amine catalysts are diethylenetriamine, triethylenediamine, bis(2,2'-dimethylamino)ethyl ether, N,N,N',N'',N''-pentamethyldiethylenetriamine, and the like. Suitable tin catalysts include dibutyltin dilaurate, dibutyltin diacetate, stannous octoate, and the like. Most preferably, both amine and tin catalysts are utilized, typically at levels of from about 0.001 to 2 parts per 100 parts by weight of component (2), the isocyanate-reactive component.

Foams of the present invention may additionally comprise low molecular weight chain extenders and/or cross-linking agents which have molecular weights preferably below about 300 Da. These are typically employed to stabilize the rising foam and to control properties. Examples include, but are not limited to, glycerine, pentaerythritol, ethylene glycol, sorbitol, and alkanolamines such as monoethanolamine, diethanolamine (DEOA) and triethanolamine (TEOA). DEOA is preferred, in amounts of from about 0 to 5 parts per 100 parts by weight of component (2), preferably about 0.4 to about 3.5 parts per 100 parts by weight of component (2).

Surfactants may also be present in the foams of the invention. Commercially available polyetherpolysiloxane foam stabilizers are preferred.

In accordance with the present invention, it has been found that the addition of a small quantity of (6) trimerized hexamethylene diisocyanate to (1) the polyisocyanate component, or (7) at least one polyhydrazodi-carbonamide (PHD) polyol to (2) the isocyanate-reactive component, results in foams which exhibit decreased aldehyde emissions.

In accordance with the present invention, the polyisocyanate component (1) may additionally comprise: (6) from 0.5 to 8 (preferably from 0.5 to 3) parts by weight of trimerized hexamethylene diisocyanate per 100 parts by weight of the polyisocyanate component (1). It is also within the scope of the present invention that (2) the isocyanate-reactive component may additionally comprise (7) from 2 to 5.5 (preferably from 2 to 5, more preferably from 2 to 3) parts of at least one polyhydrazodicarbonamide dispersion polyol per 100 parts of the isocyanate-reactive component (2). The addition of the small amount of a trimerized hexamethylene diisocyanate to the polyisocyanate component, or of a small amount of a polyhydrazodicarbonamide dispersion polyol to the isocyanate-reactive component is effective in reducing aldehyde emissions in polyurethane foams and in the process of making polyurethane foams. In particular, it has been found that these additional components enable foams to pass emissions tests such as the Toyota test, LGA test, etc.

Suitable trimerized hexamethylene diisocyanate, component (6), to be used has a functionality of about 3, an NCO group content of about 24, an isocyanurate content of about 2 and a monomer content of less than or equal to about 0.5%

Suitable polyhydrazodicabonamide polyols (which are also commonly referred to as PHD polyols or PHD dispersion polyols) for component (7) of the present invention include, for example, those compounds which are typically prepared by the in-situ polymerization of an isocyanate mixture with an amine group containing compound such as, a diamine and/or a hydrazine, in a base polyol. Preferred base polyols comprise polyether polyols and polyoxyalkylene polyols. Methods for preparing PHD polymer polyols are described in, for example, U.S. Pat. Nos. 4,089,835 and 4,260,530, the disclosures of which are hereby incorporated by reference.

PHD polyols typically have solids contents within the range of from about 3 to about 30 wt. %, preferably from about 5 to about 25 wt. %, based on the total weight of the PHD polyol. As previously discussed, PHD polyols are typically prepared by the in-situ polymerization of an isocyanate mixture in a polyol. More specifically, the isocyanate mixture typically comprises about 80 parts by weight, based on the total weight of the isocyanate mixture, of 2,4-toluene diisocyanate, and about 20 parts by weight, based on the total weight of the isocyanate mixture, of 2,6-toluene diisocyanate.

Suitable amine group containing compounds to be polymerized with the isocyanate compound include in preparing the PHD polyols, for example, compounds such as polyamines, hydrazines, hydrazides, ammonia or mixtures of ammonia and/or urea and formaldehyde.

Suitable polyamines include divalent and/or higher valent primary and/or secondary aliphatic, araliphatic, cycloaliphatic and aromatic amines, e.g. ethylene diamine; 1,2- and 1,3-propylene diamine; tetramethylene diamine; hexamethylene diamine; dodecamethylene diamine; trimethyl diaminohexane; N,N'-dimethyl-ethylenediamine; 2,2'-bisaminopropyl-methylamine; higher homologues of ethylene diamine, such as diethylene triamine, triethylene tetramine and tetraethylene pentamine; homologues of propylene diamine, such as dipropylene triamine, piperazine, N,N'-bis-aminoethyl-piperazine, triazine, 4-aminobenzylamine, 4-aminophenyl ethylamine, 1-amino-3,3,5-trimethyl-5-aminomethylcyclohexane, 4,4'-diaminodicyclohexyl-methane and -propane, 1,4-diaminocyclohexane, phenylenediamines, naphthylene diamines; condensates of aniline and formaldehyde; tolylene diamines; the bis-aminomethylbenzenes and derivatives of the above mentioned aromatic amines monoalkylated on one or both nitrogen atoms. The polyamines generally have a molecular weight of from 60 to 10,000, preferably 60 to 1000 and most preferably 60 to 200.

The hydrazines used may be hydrazine itself or monosubstituted or N,N'-disubstituted hydrazines. The substituents may be $C_1$ to $C_6$ alkyl groups, cyclohexyl groups or phenyl groups. The hydrazines generally have a molecular weight of from 32 to 200. Hydrazine itself is particularly preferred.

Suitable hydrazides include the hydrazides of divalent or higher valent carboxylic acids such as carbonic acid, oxalic acid, malonic acid, succinic acid, adipic acid, sebacic acid, azelaic acid, maleic acid, fumaric acid, phthalic acid, isophthalic acid, and terephthalic acid; the esters of a hydrazine monocarboxylic acid with dihydric or higher hydric alcohols and phenols such as ethanediol, propane-1,2-diol, butane-1,2-diol, -1,3-diol and -1,4-diol, hexanediol, diethyleneglycol, triethyleneglycol, tetraethyleneglycol, dipropyleneglycol, tripropyleneglycol and hydroquinone; and the amides of hydrazinomonocarboxylic acid (semicarbazides), e.g. with the above mentioned diamines and polyamines. The hydrazides generally have a molecular weight of from 90 to 10,000, preferably 90 to 1000 and most preferably 90 to 500.

In special cases, a proportion of isocyanates or amines, hydrazines and hydrazides which have a functionality higher than 2 may also be used, especially in combination with the corresponding monofunctional compounds.

In accordance with the present invention, preferred base polyols for preparing the PHD polyols comprise polyether polyols and poly(oxyalkylene)polyols.

PHD polymer modified polyols are typically prepared by the in-situ polymerization of an isocyanate mixture with a diamine and/or hydrazine in a base polyol, preferably, a polyether polyol. Methods for preparing PHD polymer polyols are described in, for example, U.S. Pat. Nos. 4,089,835, 4,260,530 and 4,324,715, the disclosures of which are hereby incorporated by reference.

PHD polyols typically have a polymer solids content within the range of from about 3 to about 30 wt. %, preferably from about 5 to about 25 wt. %, based on the total weight of the PHD polyol. As mentioned above, PHD polyols are typically prepared by the in-situ polymerization of an isocyanate mixture, typically, a mixture which is composed of about 80 parts by weight, based on the total weight of the isocyanate mixture, of 2,4-toluene diisocyanate and about 20 parts by weight, based on the total weight of the isocyanate mixture, of 2,6-toluene diisocyanate, in a polyol, preferably, a poly(oxyalkylene)polyol.

Other additives that may be present in the polyurethane foam formulations herein include, for example, conventional additives and auxiliaries, e.g. colorants, inorganic fillers, flame retardants, etc.

The HR (high resilience) foams of the present invention are prepared by reacting a polyisocyanate component with an isocyanate-reactive component in the presence of water as a reactive blowing agent, further in the presence of one or more catalysts, one or more surfactants, and optionally conventional additives and auxiliaries as described above. Conventional additives and auxiliaries include, for example, colorants, inorganic fillers, flame retardants, and the like. Examples of suitable additives and auxiliaries for the present invention may be found in U.S. Pat. No. 5,171,759, the disclosure of which is herein incorporated by reference, and in J. H. Saunders and K. C. Frisch, POLYURETHANES: CHEMISTRY AND TECHNOLOGY, Inter-science Publishers, New York, 1963, and the POLYURETHANE HANDBOOK, Gunter Oertel, Ed., Hanser Publications, Munich, .COPYRGT. 1985.

In accordance with the present invention, the polyisocyanate component should be present in an amount sufficient to provide an isocyanate index of from about 70 to about 130, preferably about 80 to 120, and in particular about 90 to 115.

The preparation of free rise foams typically requires mixing all components (except for the isocyanate components) together, then adding the isocyanate components to the mixture and briefly mixing. The mixture is then poured into a box and allowed to rise freely. Settling of the foam is measured, and it is oven cured at 125° C. for 5 minutes. After 16 hours at room temperature, shrinkage is noted and the foam properties can then be determined by various tests.

The preparation of molded foams typically requires that the polyol components be pre-mixed along with the additive components. The isocyanate component is then added to the pre-mix in a sufficient amount to the desired Isocyanate (NCO) Index. The reaction mixture is then dispensed by hand or machine into a metal mold which is typically preheated to a temperature of between about 62 and 66° C. The reaction mixture foams to fill the mold. After 4 to 5 minutes, the foam is removed from the mold and (physically) crushed to ensure that all cells were opened; and then aged for 2 hours.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following materials were used in the working examples.

Polyol 1: a glycerin started polyether polyol having a functionality of about 3, and an OH number of about 36; prepared by alkoxylating glycerin with a mixture of propylene oxide and ethylene oxide in a weight ratio of about 79% to about 19%

Polyol 2: a polyether polyol having a functionality of about 3, and an OH number of about 56; prepared by propoxylating Polyol 1 with 2.0% hexamethylene diamine caprolactone (HMDA-CL) adduct PMPO 1: a SAN filled polymer polyol having a solids content of about 43% which was prepared by polymerizing a mixture of acrylonitrile and styrene (in a weight ratio of about 36.5 wt. % to about 63.5 wt, %) in Polyol 1 as the base polyol component PHD Polyol 1: a polyhydrazodicarbonamide dispersion polyol having a solids content of about 20% by wt., prepared by the in-situ polymerization of toluene diisocyanate (which contains 20% by wt. of 2,6-TDI and 80% of 2,4-TDI) with hydrazine hydrate in a base polyol having a functionality of about 3, and an OH number of about 35, which was prepared by alkoxylating glycerine with propylene oxide and ethylene oxide in a wt. ratio of about 83%:17%

DEOA-LF: diethanolamine (85 wt. %) in water (15 wt. %), a crosslinker

DC-5164: a silicone surfactant

DC-5169: a silicone surfactant

Catalyst 1: 1,4-diaza-bicyclo[2.2.2]octane (33% by wt.) in dipropylene glycol (67% by wt.), commercially available as Niax A-33

Catalyst 2: bis[2-dimethylaminoethyl]ether (70% by wt.) in dipropylene glycol (30% by wt.), commercially available as Niax A-1

Iso 1: toluene diisocyanate containing 80% by wt. of 2,4-TDI and 20% of 2,6-TDI

Iso 2: hexamethylene diisocyanate timer having an NCO group content of about 24%, a functionality of about 3.1, and a maximum monomer content of 0.5% in which HDI is the monomer Irganox 1076: octadecyl 3,5-di-(tert)-butyl-4-hydroxyhydrocinnamate, an antioxidant The foam formulations are as set forth in the tables below.

A series of free rise foams were prepared in conventional manner by mixing thoroughly all non-isocyanate ingredients, adding the isocyanate and mixing briefly; then pouring the mixture into a standard 14 inch (35.6 cm) by 14 inch (35.6 cm) by 6 inch (15.2 cm) cake box, and allowing to rise freely, following which the settle is measured, and the foam is oven cured at 125° C. for 5 minutes. After a minimum of 16 hours at room temperature, shrinkage, if any, is noted, and a 12 inch (30 cm) by 12 inch (30 cm) by 4 inch (10 cm) portion is cut for assessing the quality of the foam.

Examples 1-15 were free rise foams. The aldehyde emissions of these foams were tested using the Toyota Method TSM0508G and CertiPUR test methods. These are global protocols for molded and slab foams.

TABLE 1A

Foam Formulations for Examples 1-8

| | Example | | | | | | | |
|---|---|---|---|---|---|---|---|---|
| | 1 | 2 | 3 | 4 | 5 | 6 | 7 | 8 |
| B-Side: | | | | | | | | |
| PMPO 1 | 47.40 | 45.70 | 47.70 | 45.70 | 42.70 | 47.70 | 47.70 | 42.70 |
| Polyol 1 | 52.30 | 52.30 | 52.30 | 52.30 | 52.30 | 52.30 | 52.30 | 52.30 |
| Irganox 1076 | | | | 4500 ppm | | 4500 ppm | | 4500 ppm |
| PHD Polyol 1 | 0 | 2.00 | 0 | 2.00 | 5.00 | 0 | 0 | 5.00 |
| Water | 3.27 | 3.27 | 3.27 | 3.27 | 3.27 | 3.27 | 3.27 | 3.27 |
| DEOA-LF | 1.73 | 1.73 | 1.73 | 1.73 | 1.73 | 1.73 | 1.73 | 1.73 |
| DC-5164 | 0.99 | 0.99 | 0.99 | 0.99 | 0.99 | 0.99 | 0.99 | 0.99 |
| DC-5169 | 0.66 | 0.66 | 0.66 | 0.66 | 0.66 | 0.66 | 0.66 | 0.66 |
| Catalyst 1 | 0.19 | 0.19 | 0.19 | 0.19 | 0.19 | 0.19 | 0.19 | 0.19 |
| Catalyst 2 | 0.05 | 0.05 | 0.05 | 0.05 | 0.05 | 0.05 | 0.05 | 0.05 |
| A-Side: | | | | | | | | |
| Iso 1 | 42.33 | 42.35 | 42.22 | 42.35 | 42.39 | 42.33 | 42.11 | 42.39 |
| Iso 2 | 0 | 0 | 0.21 | 0 | 0 | 0 | 0.43 | 0 |
| NCO INDEX | 100.00 | 100.00 | 100.00 | 100.00 | 100.00 | 100.00 | 100.00 | 100.00 |

TABLE 1B

Foam Processing and Characteristics for Examples 1-8:

| | Example | | | | | | | |
|---|---|---|---|---|---|---|---|---|
| | 1 | 2 | 3 | 4 | 5 | 6 | 7 | 8 |
| Batch Size | 700.00 | 700.00 | 700.00 | 700.00 | 700.00 | 700.00 | 700.00 | 700.00 |
| % Solids | 20.51 | 20.05 | 20.51 | 20.05 | 19.36 | 20.51 | 20.51 | 19.36 |
| Total Water | 3.53 | 3.53 | 3.53 | 3.53 | 3.53 | 3.53 | 3.53 | 3.53 |
| Room Temp (° C.) | 22 | 22 | 22 | 22 | 22 | 22 | 22 | 22 |
| Relative Humidity (%) | 41.00 | 41.00 | 41.00 | 41.00 | 41.00 | 37.00 | 37.00 | 37.00 |
| Test Method: | Slab | Slab | Slab | Slab | Slab | Slab | Slab | Slab |
| Box size (cm) | 35.6 × 35.6 × 15.2 | 35.6 × 35.6 × 15.2 | 35.6 × 35.6 × 15.2 | 35.6 × 35.6 × 15.2 | 35.6 × 35.6 × 15.2 | 35.6 × 35.6 × 15.2 | 35.6 × 35.6 × 15.2 | 35.6 × 35.6 × 15.2 |
| Cream time (seconds) | 10.00 | 10.00 | 10.00 | 10.00 | 10.00 | 10.00 | 10.00 | 10.00 |
| Rise Time (seconds) | 139.00 | 139.00 | 139.00 | 136.00 | 148.00 | 122.00 | 145.00 | 130.00 |
| Max Rise Ht. (inches) | 8.57 | 8.71 | 8.52 | 8.50 | 8.43 | 8.53 | 8.64 | 8.37 |
| Max Rise Ht. (cm) | 21.77 | 22.12 | 21.64 | 21.59 | 21.41 | 21.67 | 21.95 | 21.26 |
| Final Ht. (inches) | 8.38 | 8.47 | 8.29 | 7.82 | 8.25 | 7.94 | 8.27 | 7.71 |
| Final Ht. (cm) | 21.29 | 21.51 | 21.06 | 19.86 | 20.96 | 20.17 | 21.01 | 19.58 |

TABLE 2A

Foam Formulations for Examples 9-15

| | Example | | | | | | |
|---|---|---|---|---|---|---|---|
| | 9 | 10 | 11 | 12 | 13 | 14 | 15 |
| B-Side: | | | | | | | |
| PMPO 1 | 32.70 | 47.70 | 47.70 | 17.70 | 47.70 | 47.70 | 47.70 |
| Polyol 1 | 52.30 | 52.30 | 52.30 | 52.30 | 48.30 | 52.30 | 52.30 |
| Irganox 1076 | | | 4500 ppm | | | 4500 ppm | |
| Polyol 2 | 0 | 0 | 0 | 0 | 4.00 | 0 | 0 |
| PHD Poyol 1 | 15.00 | 0 | 0 | 30.00 | 0 | 0 | 0 |
| Water | 3.27 | 3.27 | 3.27 | 3.27 | 3.27 | 3.27 | 3.27 |
| DEOA-LF | 1.73 | 1.73 | 1.73 | 1.73 | 1.73 | 1.73 | 1.73 |
| DC-5164 | 0.99 | 0.99 | 0.99 | 0.99 | 0.99 | 0.99 | 0.99 |
| DC-5169 | 0.66 | 0.66 | 0.66 | 0.66 | 0.66 | 0.66 | 0.66 |

TABLE 2A-continued

Foam Formulations for Examples 9-15

| | Example | | | | | | |
|---|---|---|---|---|---|---|---|
| | 9 | 10 | 11 | 12 | 13 | 14 | 15 |
| Catalyst 1 | 0.19 | 0.19 | 0.19 | 0.19 | 0.19 | 0.19 | 0.19 |
| Catalyst 2 | 0.05 | 0.05 | 0.05 | 0.05 | 0.05 | 0.05 | 0.05 |
| A-Side: | | | | | | | |
| Iso 1 | 42.51 | 41.90 | 42.22 | 42.69 | 42.45 | 42.11 | 42.33 |
| Iso 2 | 0 | 0.86 | 0.21 | 0 | 0 | 0.43 | 0 |
| NCO INDEX | 100.00 | 100.00 | 100.00 | 100.00 | 100.00 | 100.00 | 100.00 |

TABLE 2B

Foam Processing and Characteristics for Examples 9-15

| | Example | | | | | | |
|---|---|---|---|---|---|---|---|
| | 9 | 10 | 11 | 12 | 13 | 14 | 15 |
| Batch Size | 700.00 | 700.00 | 700.00 | 700.00 | 700.00 | 700.00 | 700.00 |
| % Solids | 17.06 | 20.51 | 20.51 | 13.61 | 20.51 | 20.51 | 20.51 |
| Total Water | 3.57 | 3.53 | 3.53 | 3.60 | 3.53 | 3.53 | 3.53 |
| Room Temp (° C.) | 22 | 22 | 22 | 22 | 22 | 22 | 22 |
| Relative Humidity (%) | 37.00 | 37.00 | 35.00 | 35.00 | 35.00 | 35.00 | 35.00 |
| Test Method: | Slab | Slab | Slab | Slab | Slab | Slab | Slab |
| Box size (cm) | 35.6 × 35.6 × 15.2 | 35.6 × 35.6 × 15.2 | 35.6 × 35.6 × 15.2 | 35.6 × 35.6 × 15.2 | 35.6 × 35.6 × 15.2 | 35.6 × 35.6 × 15.2 | 35.6 × 35.6 × 15.2 |
| Cream time (seconds) | 10.00 | 10.00 | 10.00 | 10.00 | 10.00 | 10.00 | 10.00 |
| Rise Time (seconds) | 146.00 | NVB | 123.00 | 163.00 | 125.00 | 218.00 | 139.00 |
| Max Rise Ht. (inches) | 8.51 | 8.71 | 8.56 | 8.58 | 8.43 | 8.59 | 8.54 |
| Max Rise Ht. (cm) | 21.62 | 22.12 | 21.74 | 21.79 | 21.41 | 21.82 | 21.69 |
| Final Ht. (inches) | 8.25 | 8.35 | 7.85 | 8.40 | 7.65 | 8.12 | 8.29 |
| Final Ht. (cm) | 20.96 | 21.21 | 19.94 | 21.34 | 19.43 | 20.63 | 21.06 |

TABLE 3

Concentration of Aldehydes[1] (in ug/sample) in Examples 1, 2, 4, 5, 6, 8, 9, 12, 13 and 15:

| | Example | | | | | | | | | |
|---|---|---|---|---|---|---|---|---|---|---|
| | 1 | 2 | 4 | 5 | 6 | 8 | 9 | 12 | 13 | 15 |
| pbw of PHD Polyol 1 | 0 | 2 | 2 | 5 | 0 | 5 | 15 | 30 | 0 | 0 |
| Formaldehyde @ 2 weeks | 0.945 | 0.45 | 0.55 | 0.15 | 0.67 | 0.14 | 0.17 | 0.09 | 0.89 | 1.18 |
| Formaldehyde @ 4 weeks | 0.62 | 0.43 | 0.37 | 0.23 | 0.68 | 0.36 | 0.19 | 0.10 | 0.50 | 0.90 |
| Acetaldehyde @ 2 weeks | 0.68 | 0.61 | 0.55 | 0.38 | 0.24 | 0.30 | 0.46 | 0.38 | 0.25 | 0.34 |
| Acetaldehyde @ 4 weeks | 1.03 | 0.62 | 0.19 | 0.41 | 0.41 | 0.50 | 0.64 | 0.50 | 0.24 | 1.03 |

[1]determined by Toyota Method TSM0508G

TABLE 4

Concentration of Aldehydes[1] (in ug/sample) in Examples 1, 3, 6, 7, 10, 11, 13, 14 and 15:

| | Example | | | | | | | | |
|---|---|---|---|---|---|---|---|---|---|
| | 1 | 3 | 6 | 7 | 10 | 11 | 13 | 14 | 15 |
| pbw of Iso 2 | 0 | 0.21 | 0 | 0.43 | 0.86 | 0.21 | 0 | 0.43 | 0 |
| Formaldehyde @ 2 weeks | 0.92 | 1.00 | 0.70 | 0.95 | 0.78 | 0.99 | 0.90 | 1.25 | 1.20 |
| Formaldehyde @ 4 weeks | 0.61 | 0.93 | 0.70 | 0.75 | 0.88 | 0.61 | 0.52 | 0.70 | 1.115 |

TABLE 4-continued

Concentration of Aldehydes[1] (in ug/sample) in Examples 1, 3, 6, 7, 10, 11, 13, 14 and 15:

| | Example | | | | | | | | |
|---|---|---|---|---|---|---|---|---|---|
| | 1 | 3 | 6 | 7 | 10 | 11 | 13 | 14 | 15 |
| Acetaldehyde @ 2 weeks | 0.68 | 0.45 | 0.25 | 0.30 | 0.79 | 0.25 | 0.24 | 0.30 | 0.35 |
| Acetaldehyde @ 4 weeks | 1.03 | 0.41 | 0.42 | 0.75 | 0.61 | 0.30 | 0.25 | 0.48 | 0.80 |

[1]determined by Toyota Method TSM0508G

Molded foams were prepared by pre-mixing polyols and additive components. The isocyanate component was then added to the pre-mix according to the isocyanate (NCO) index listed in each example (generally 90 to 110). The reacting mixture was dispensed by hand or using machines into a water jacketed aluminum mold that had been heated to a temperature of between 145° F. and 155° F. (i.e. about 62° C. and 66° C.). The reacting mixture foamed to fill the mold. After 4.5 minutes, the finished foam was removed from the mold and physically crushed to ensure that all cells were opened; aged in ventilated cabinet for 2 hours after which time they were wrapped in aluminum foil, then immediately placed in plastic bags (one bag per foam) in accordance with CertiPUR and Toyota packaging protocols. This prevents the VOCs from escaping/eluting.

The foams in Examples 16-19 were molded foams prepared as described above.

TABLE 5

Foams 16-19

| | Example | | | |
|---|---|---|---|---|
| | 16 | 17 | 18 | 19 |
| B-side: | | | | |
| PMPO 1 | | | 23.85 | 47.7 |
| Polyol 1 | | | 26.15 | 52.3 |
| PHD Polyol 1 | 100 | 50 | | |
| Water | 3.27 | 3.27 | 3.27 | |
| DEOA-LF | 1.73 | 1.73 | 1.73 | |
| DC-5164 | 0.9 | 0.9 | 0.9 | |
| DC-5169 | 0.6 | 0.6 | 0.6 | |
| Catalyst 1 | 0.32 | 0.32 | 0.32 | |
| Catalyst 2 | 0.08 | 0.08 | 0.08 | |
| A-Side: | | | | |
| Iso 1 | 42.4 | 42.42 | 42.45 | |
| NCO Index | 100 | 100 | 100 | |
| Processing Characteristics | | | | |
| Polyol batch size (g) | 460 | 460 | 460 | |
| % solids | 20.0 | 20.26 | 20.51 | |
| Mold Size (cm) | 38.1 × 38.1 × 10.2 | 38.1 × 38.1 × 10.2 | 38.1 × 38.1 × 10.2 | |
| Mold Temp (° C.) | 65.5 | 65.5 | 65.5 | |
| Part weight (g) | 490 | 497 | 503 | |
| Room Temp ° C. | 22 | 22 | 22 | |
| Relative Humidity (%) | 39.0 | 38.0 | 40.0 | |
| Aldehyde Emissions[1] (Ug/sample) | | | | |
| Formaldehyde @ 2 weeks[2] | 10 | 165 | 95 | 0.06 |
| Acetaldehyde @ 2 weeks[2] | 0.4 | 0.475 | 1.0 | 0.13 |

[1]Toyota Method TSM0508G
[2]No blank correction

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurethane foam comprising the reaction product of:
   (1) a polyisocyanate component, with
   (2) an isocyanate-reactive component comprising:
       (a) at least one polyether polyol having a functionality of from 2 to 6, an OH number of from 18 to 238, and a number average molecular weight of from 160 to 8000; and
       (b) at least one filled polyol having an OH number of 18 to 32, a number average molecular weight of 2000 to 8000, and containing from 5 to 60% by weight of solids, which is selected from the group consisting of (i) styrene-acrylonitrile polymer polyols, (ii) polyisocyanate polyaddition (PIPA) polyols and (iii) mixtures thereof;
   in the presence of
   (3) at least one blowing gent;
   (4) at least one catalyst; and
   (5) at least one surfactant;
   wherein (1) said polyisocyanate component additionally comprises (6) from 0.5 to 8 parts of trimerized hexamethylene diisocyanate per 100 parts of polyisocyanate, or (2) said isocyanate-reactive component additionally comprises (7) from 2 to 5.5 parts of at least one polyhydrazodicarbonamide dispersion polyol per 100 parts of isocyanate-reactive component.

2. The foam of claim 1, wherein (1) said polyisocyanate component comprises toluene diisocyanate.

3. The foam of claim 1, wherein (2)(a) said polyether polyols have a functionality of 2.5 to 3.5, and an OH number of about 28 to about 42.

4. The foam of claim 1, wherein (2)(b) said filled polyols have solids contents of from 10 to 50% by weight.

5. The foam of claim 1, wherein (1) said polyisocyanate component additionally comprises (6) from 0.5 to 3 parts by weight of trimerized hexamethylene diisocyanate per 100 parts of said polyisocyanate component, or (2) said isocyanate-reactive component additionally comprises (7) from 2 to 5 parts of at least one polyhydrazodicarbonamide dispersion polyol per 100 parts of said isocyanate-reactive component.

6. A process for preparing a polyurethane foam comprising:
(A) reacting:
(1) a polyisocyanate component,
with
(2) an isocyanate reactive component comprising:
(a) at least one polyether polyol having a functionality of from 2 to 6, an OH number of from 18 to 238, and a number average molecular weight of from 160 to 8000,
and
(b) at least one filled polyol having an OH number of 18 to 32, a number average molecular weight of 2000 to 8000, and containing from 5 to 60% by weight of solids, which is selected from the group consisting of (i) styrene-acrylonitrile polymer polyols, (ii) polyisocyanate polyaddition (PIPA) polyols and (iii) mixtures thereof;
in the presence of
(3) at least one blowing agent;
(4) at least one catalyst;
and
(5) at least one surfactant;
wherein (1) said polyisocyanate component additionally comprises (6) from 0.5 to 8 parts of trimerized hexamethylene diisocyanate per 100 parts of polyisocyanate, or (2) said isocyanate-reactive component additionally comprises (7) from 2 to 5.5 parts of at least one polyhydrazoclicarbonamide dispersion polyol per 100 parts of isocyanate-reactive component.

7. The process of claim 6, wherein (1) aid polyisocyanate component comprises toluene diisocyanate.

8. The process of claim 6, wherein (2)(a) said polyether polyols have a functionality of 2.5 to 3.5, and an OH number of about 28 to about 42.

9. The process of claim 6, wherein (2)(b) said filled polyols have solids contents of from 10 to 50% by weight.

10. The process of claim 6, wherein (1) said polyisocyanate component additionally comprises (6) from 0.5 to 3 parts by weight of trimerized hexamethylene diisocyanate per 100 parts of said polyisocyanate component, or (2) said isocyanate-reactive component additionally comprises (7) from 2 to 5 parts of at least one polyhydrazodicarbonamide dispersion polyol per 100 parts of said isocyanate-reactive component.

11. A method of decreasing formaldehyde emissions in a foam comprising:
(A) reacting:
(1) a polyisocyanate component,
with
(2) an isocyanate-reactive component comprising:
(a) one or more polyoxyalkylene polyols having a functionality of from 2 to 6, an OH number of from 18 to 238, a number average molecular weight of from 160 to 8000,
and
(b) one or more filled polyols having an OH number of 18 to 32, a number average molecular weight of 2000 to 8000 and containing from 5 to 60% by weight of solids;
in the presence of
(3) at least one blowing agent;
(4) at least one catalyst;
and
(5) at least one surfactant;
wherein (1) said polyisocyanate component additionally comprises (6) from 0.5 to 8 parts of trimerized hexamethylene diisocyanate per 100 parts of polyisocyanate, or (2) said isocyanate-reactive component additionally comprises (7) from 2 to 5.5 parts of at least one polyhydrazodicarbonamide dispersion polyol per 100 parts of isocyanate-reactive component.

12. The method of claim 11, wherein (1) said polyisocyanate component comprises toluene diisocyanate.

13. The method of claim 11, wherein (2)(a) said polyether polyols have a functionality of 2.5 to 3.5, and an OH number of about 28 to about 42.

14. The method of claim 11, wherein (2)(b) said filled polyols have solids contents of from 10 to 50% by weight.

15. The method of claim 11, wherein (1) said polyisocyanate component additionally comprises (6) from 0.5 to 3 parts by weight of trimerized hexamethylene diisocyanate per 100 parts of said polyisocyanate component, or (2) said isocyanate-reactive component additionally comprises (7) from 2 to 5 parts of at least one polyhydrazodicarbonamide dispersion polyol per 100 parts of said isocyanate-reactive component.

* * * * *

UNITED STATES PATENT AND TRADEMARK OFFICE
CERTIFICATE OF CORRECTION

PATENT NO. : 10,066,047 B2
APPLICATION NO. : 13/364385
DATED : September 4, 2018
INVENTOR(S) : Emmanuel George et al.

It is certified that error appears in the above-identified patent and that said Letters Patent is hereby corrected as shown below:

In the Specification

The values for "Formaldehyde @ 2 weeks" in TABLE 5 at Column 18:
In Example 16, the value "10" should be deleted and --.10-- inserted therefore.
In Example 17, the value "165" should be deleted and --.165-- inserted therefore.
In Example 18, the value "95" should be deleted and --.95-- inserted therefore.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*